United States Patent
Peikari

(10) Patent No.: US 7,239,850 B2
(45) Date of Patent: Jul. 3, 2007

(54) OPTIMIZING THE PROTECTION OF WIRELESS LOCAL AREA NETWORKS WITH REAL-TIME, FLEXIBLE, PERIMETER SENSOR FEEDBACK

(75) Inventor: Cyrus Peikari, 3241 Purdue Ave., Dallas, TX (US) 75225

(73) Assignee: Cyrus Peikari, Dallas, TX (US)

( * ) Notice: Subject to any disclaimer, the term of this patent is extended or adjusted under 35 U.S.C. 154(b) by 40 days.

(21) Appl. No.: 10/896,809

(22) Filed: Jul. 22, 2004

(65) Prior Publication Data

US 2005/0020256 A1    Jan. 27, 2005

(51) Int. Cl.
*H04B 1/00* (2006.01)
*H04B 7/00* (2006.01)

(52) U.S. Cl. ............ 455/69; 455/24; 455/421; 455/422.1; 455/423; 455/67.11; 455/512

(58) Field of Classification Search ............ 455/422.1, 455/423, 424, 421, 67.11, 69, 512, 24
See application file for complete search history.

(56) References Cited

U.S. PATENT DOCUMENTS

| | | | |
|---|---|---|---|
| 6,978,023 B2* | 12/2005 | Dacosta | 380/258 |
| 2002/0127993 A1* | 9/2002 | Zappala | 455/404 |
| 2004/0137915 A1* | 7/2004 | Diener et al. | 455/456.1 |
| 2005/0003828 A1* | 1/2005 | Sugar et al. | 455/456.1 |

* cited by examiner

*Primary Examiner*—Jean Gelin
*Assistant Examiner*—Huy Phan

(57) ABSTRACT

The invention optimizes the security of data communication on wireless local area networks (WLANs). This invention uses radio frequency (RF) radiation sensors (sensors) on the physical perimeter of a campus, or between nodes in a wireless mesh network, to detect signal bleed outside of an acceptable geographic range. In a preferred embodiment, this is achieved by (1) setting the acceptable signal strength ("bleed") to be allowed at the perimeter, (2) sensing the RF signal strength at the perimeter sensors, (3) providing feedback from the sensors to the central radiation source controller (controller), (4) adjusting the central radiation source signal strength upwards or downwards based on acceptable ranges, (5) repeating this procedure in real time to provide constant optimization.

21 Claims, 3 Drawing Sheets

OPTIMIZING THE PROTECTION OF WIRELESS LOCAL AREA NETWORKS WITH REAL-TIME, FLEXIBLE, PERIMETER SENSOR FEEDBACK

CROSS-REFERENCE TO RELATED APPLICATIONS

Not Applicable

STATEMENT REGARDING FEDERALLY SPONSORED RESEARCH OR DEVELOPMENT

Not Applicable

FIELD OF THE INVENTION

The invention relates to the protection of data communication. In particular, the invention is directed to increasing the security of wireless networks.

BACKGROUND OF THE INVENTION

Wireless networks and wireless local area networks (WLANs) are becoming increasingly common and are forming an increasingly vital part of global networks. The typical WLAN has one or more access points (APs) that broadcast and receive wireless signals from the wireless network. On a typical corporate campus, the intent is to provide wireless coverage for the central buildings of the campus while minimizing signal drift (i.e., "bleed") outside of the geographic boundaries of the campus property.

A typical access point generates a radio frequency signal in a spherical distribution. Users near the center of the sphere (i.e., closest to the access point) will receive the strongest signal. However, the signal strength decays as users move towards the periphery of the sphere. In an ideally secure campus, the signal dies out altogether before it reaches the physical boundaries of the property on which the campus is located. This would help to prevent unauthorized users (i.e., attackers) from driving by outside of the campus property and intercepting confidential wireless signals.

Unfortunately, WLAN radiation zones have a tendency to spill over or "bleed" radio frequency broadcasts beyond the defined, allowable perimeter of campus properties. This is extremely dangerous, because unauthorized users can walk or drive by (while remaining safely outside of the property) and can intercept private data transmissions from the campus WLAN. Such unauthorized users are commonly known as "wardrivers." Wardriving can be performed my malicious users who want to surreptitiously eavesdrop or spy on private WLAN communications through radio frequency transmissions over a distance. Thus, it is vital to be able to minimize signal "bleed" at the boundaries of the property. This will keep the signal within an acceptable (i.e., secure) physical perimeter, thus helping to protect against wardrivers.

In the prior art, the only way to measure signal bleed is for a user to physically walk around the perimeter of the property and to measure signal strength at each point on the perimeter, by hand, using a mobile computing device and the appropriate software. Software such as Netstumbler and Kismet already exists to perform such a task. Unfortunately, the prior art suffers from several drawbacks. For example, because of electromagnetic interference, signal strength on the perimeter (i.e., bleed) is not static, but rather constantly waxes and wanes, like the ebb and flow of ocean tides. Thus, by the time the signal is measured by hand and recorded in the prior art, the signal may have already changed. In addition, environmental conditions affect signal bleed. For example, weather changes will cause the signal bleed to wax and wane with time.

Furthermore, in wireless local networks there is a need to regulate the power transmitted by an antenna in a particular direction. For example, existing software-controlled directional antenna can selectively beam data in different directions, depending on where the client (i.e., the target user's device) is located at that particular time. In this case, it would be advantageous for the directional antenna to send only enough power in a particular direction to serve the client's requirements. Such an optimization would improve efficiency by reducing overall power consumption by the antenna. It would also limit RF interference in the local neighborhood by providing just enough power to serve a client's needs, and only in the direction of the client's location.

In addition, wireless "mesh" networks are becoming more more prevalent. In a mesh network, various wireless devices of all types (such as laptops, cellphones, etc.) can automatically interconnect with one another when they are within a certain range. The mesh network can grow larger or smaller depending on how many devices are connected at the periphery of the mesh. In this case, it would advantageous to limit signal strength between individual "nodes", or devices, in the mesh. By limiting signal strength of each node to the minimum level required to communicate with one or more of its neighbors, RF interferences of the mesh as a whole is reduced. Furthermore, limiting signal strength in a particular direction would further optimize the power efficiency and security of the wireless mesh network.

Currently, the prior art has no provision for automatically and flexibly adjusting perimeter RF signal bleed or directional signal strength in real time. Thus, power consumption is not optimized, and interference between devices can occur. In addition, uncontrolled, excessive signal bleed that changes over time and can subject the WLAN to interception and attacks from outside, malicious wardrivers.

BRIEF SUMMARY OF THE INVENTION

The present invention overcomes the disadvantages of the prior art, by offering the following:

In a first embodiment, the present invention provides a method and apparatus for protecting wireless networks by using radio frequency (RF) radiation sensors (sensors) on the physical perimeter of a campus to detect signal bleed outside of an acceptable geographic range. These sensors provide feedback to the central controller to flexibly adjust signal strength in real time, thus preventing signal bleed beyond an acceptable geographic range.

In a second embodiment, the present invention provides a method and apparatus for protecting wireless networks by using multiple, independent, directional, amplified radio frequency (RF) radiation sensors (sensors) on the physical perimeter of a campus to detect signal bleed outside of an acceptable geographic range.

In a third embodiment, the present invention provides a method and apparatus for protecting wireless network signal bleed outside of an outer perimeter, while attempting to maintain adequate signal strength within an inner perimeter. In this embodiment, there are two or more distinct "layers" of sensors distributed around the periphery of (a) one ore more outer perimeters, such as the fence marking the boundaries of the campus property, and (b) one or more inner perimeters, such as the outer walls of a building located on the campus property. In this embodiment, the sensors on the outer perimeter provide continual feedback to ensure the signal strength does not rise above a level to cause "bleed" beyond the campus property. Meanwhile, the inner perimeter of sensors provides continual feedback to ensure the signal strength inside the building does not fall below a minimum level to ensure adequate wireless coverage for users within the building.

Each of these embodiments can be achieved by the following preferred system for: (1) setting the acceptable signal strength ("bleed") to be allowed at the perimeter, (2) sensing the RF signal strength at the perimeter sensors, (3) providing feedback from the sensors to the central radiation source controller (controller), (4) adjusting the central radiation source signal strength upwards or downwards based on acceptable ranges, (5) repeating this procedure in real time to provide constant optimization.

BRIEF DESCRIPTION OF THE DRAWINGS

The present invention may be understood more clearly from the following detailed description, which is solely for explanation and should not be taken to limit the invention to any specific form thereof, taken together with the accompanying drawings, wherein.

DETAILED DESCRIPTION OF THE INVENTION

Figure 1:
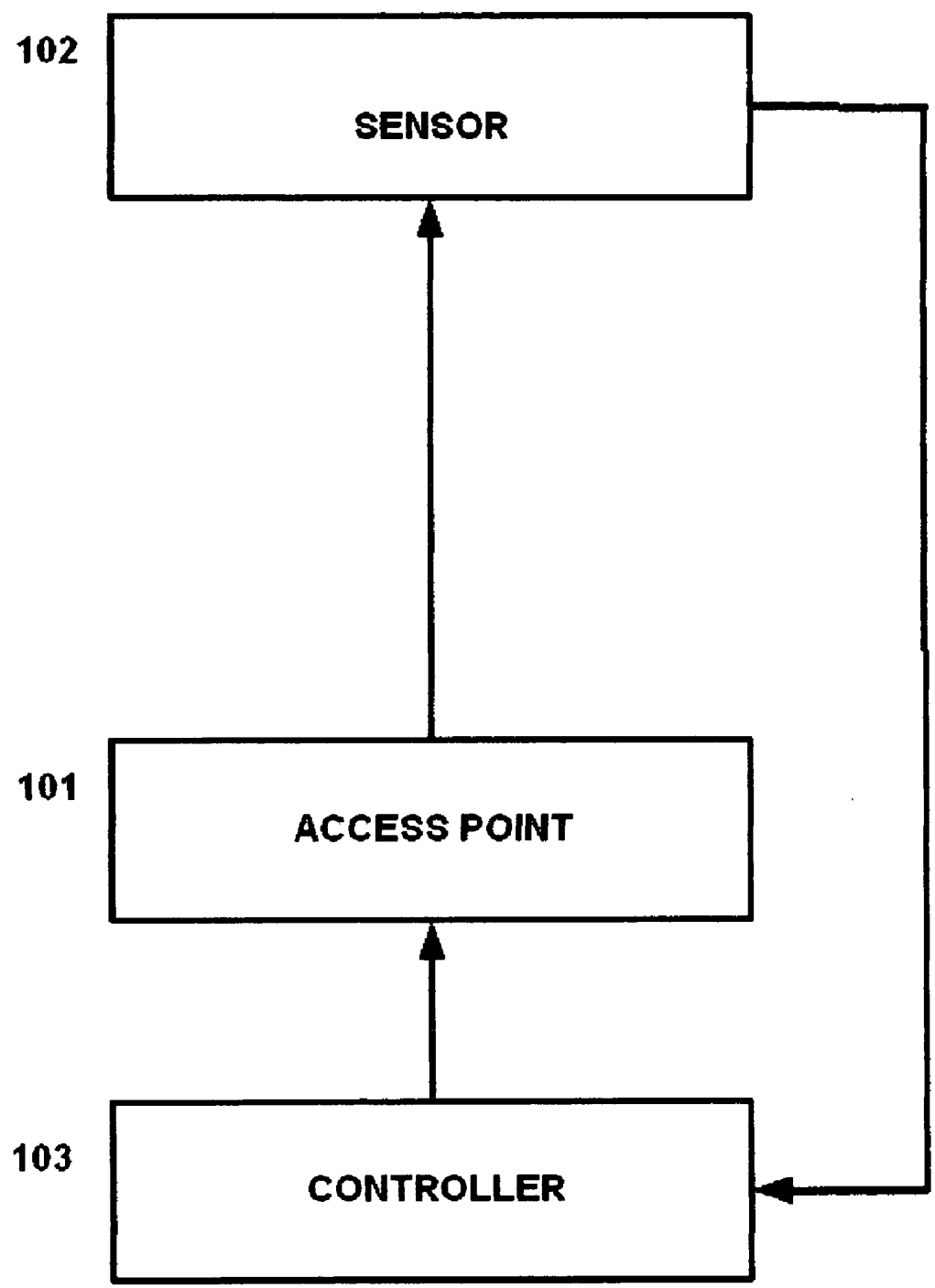
FIG. 1 illustrates a wireless local area network (WLAN) that is configured to utilize the present invention.

The operation of the present invention will now be described in conjunction with the Drawing Figures.

FIG. 1 is a flow diagram illustrating an embodiment of the present invention, which protects wireless networks by using radio frequency (RF) radiation sensors (sensors) on the physical perimeter of a campus to detect signal bleed outside of an acceptable geographic range. These sensors provide feedback to the central controller to flexibly adjust signal strength in real time, thus preventing signal bleed beyond an acceptable geographic range.

As shown in FIG. 1, the access point (AP) at step 101 produces a radio frequency signal. This signal is broadcast across the campus, and may be received by the exemplary sensor located on the perimeter at step 102.

If the perimeter sensor at step 102 detects a predetermined signal strength from the AP at step 101, this means that the signal is bleeding beyond the desired range. The perimeter sensor at step 102 will then automatically signal the controller at step 103. The controller at step 103 responds to the signal from step 102 by reducing the signal output from the access point at step 101. These steps repeat continuously to ensure real-time protection from excessive signal bleed detected at the sensor perimeter at step 102.

Figure 2:
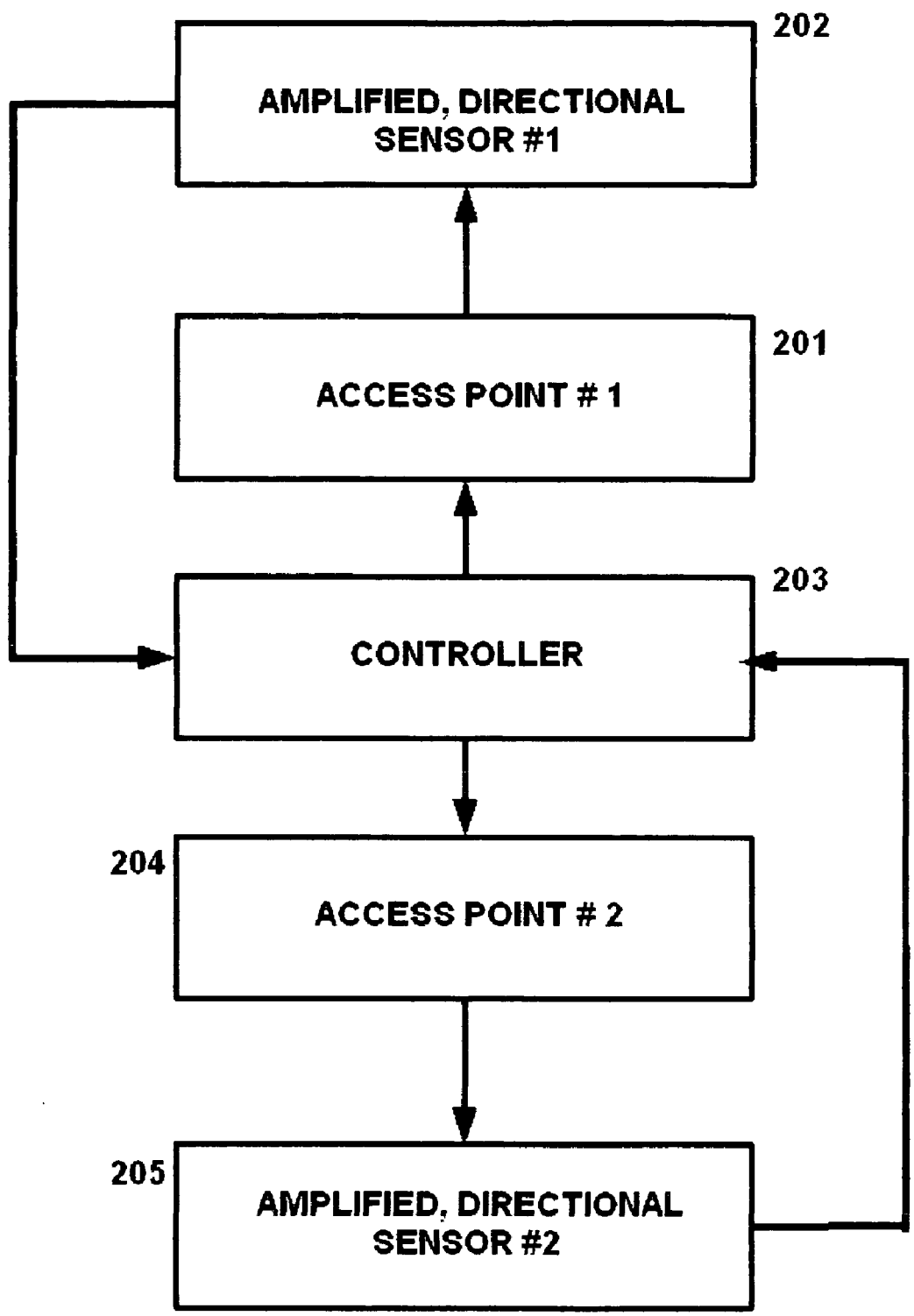
FIG. 2 illustrates a wireless local area network (WLAN) that is configured to utilize a second embodiment of the preferred invention.

FIG. 2 is a flow diagram illustrating another embodiment of the present invention, which protects wireless networks by using multiple, independent, directional, amplified radio frequency (RF) radiation sensors (sensors) on the physical perimeter of a campus to detect signal bleed outside of an acceptable geographic range. These sensors provide more granular, accurate and sensitive feedback to the central controller for flexibly adjusting signal strength in real time, thus preventing signal bleed beyond a an acceptable geographic range.

In this embodiment, there are multiple, directional amplified sensors at different points on a perimeter, such as seen at step 202 (amplified, directional sensor #1) and at step 205 (amplified, directional sensor #2).

If the perimeter amplified, directional sensor #1 at step 202 detects a pre-determined signal strength from the access point #1 at step 201, this means that the signal from access point #1 at step 201 is bleeding beyond the desired range. The perimeter sensor at step 202 will then automatically signal the controller at step 203. The controller at step 203 responds to the signal from step 202 by reducing the signal output from the access point #1 at step 201. These steps repeat continuously to ensure real-time, amplified, directional protection from excessive signal bleed detected at the sensor perimeter at step 202.

Meanwhile, another sensor located at a different point in the perimeter (amplified, directional sensor #2) stands guard at step 205. If the perimeter amplified, directional sensor #2 at step 205 detects a pre-determined signal strength from the access point #2 at step 204, this means that the signal from access point #2 at step 204 is bleeding beyond the desired range. The perimeter sensor at step 205 will then automatically signal the controller at step 203. The controller at step 203 responds to the signal from step 205 by reducing the signal output from the access point #2 at step 204. These steps repeat continuously to ensure real-time, amplified, directional protection from excessive signal bleed detected at the sensor perimeter at step 205

Thus, both the amplified, directional sensor #1 at step 202 and the amplified, directional sensor #2 at step 205 work simultaneously to provide granular, independent feedback to the central controller at step 203. In turn, the controller at step 203 simultaneously regulates the signal strength output at both the access point #1 at step 201 and the access point #2 at step 204.

Figure 3:
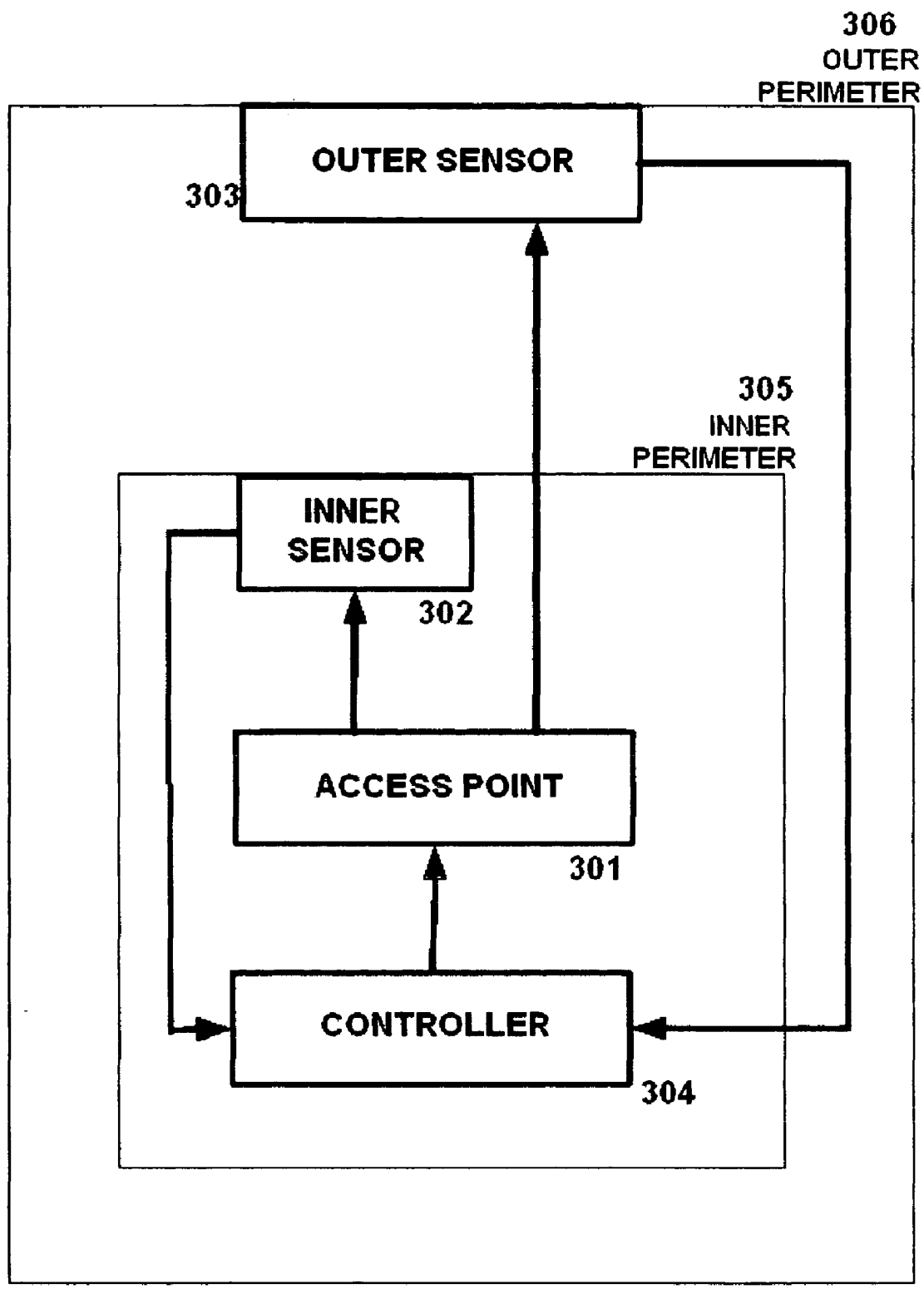
FIG. 3 illustrates a wireless local area network (WLAN) that is configured to utilize a third embodiment of the preferred invention.

FIG. 3 is a flow diagram illustrating another embodiment of the present invention, which protects wireless network signals from bleeding outside of an outer perimeter, while attempting to maintain adequate signal strength within an inner perimeter. In this embodiment, there are at least two distinct "layers" of sensors distributed around the periphery of (a) an outer perimeter, such as the fence marking the boundaries of the campus property, and (b) an inner perimeter, such as the outer walls of a building located on the campus property. In this embodiment, the outer sensors on the outer perimeter provide continual feedback to ensure the signal strength does not rise above a detectable level, causing unwanted "bleed" beyond the campus property. Only two layers are shown here, however one or more intermediate levels may be added, each additional layer embodying the characteristics of (a) or (b) above. Meanwhile, the inner perimeter of sensors provides continual feedback ensure the signal strength inside the building does not fall below a minimum level in an to attempt to ensure adequate wireless coverage for users within the building. In this embodiment, each perimeter can also be located on a particular node in a wireless mesh network. Furthermore, both perimeters can optionally be located at the same point in space (i.e., on the same device).

In this embodiment, there are two distinct sensors. The inner sensor at step 302 is located at the periphery of an inner perimeter at step 305. In contrast, the outer sensor at step 303 is located at the periphery of an outer perimeter at step 306.

When an access point at step 301 broadcasts a signal, the inner sensor at step 302 receives it. The inner sensor is located along the periphery of the inner perimeter at step 305. If the signal received at the inner sensor at step 302 falls below a predetermined level, this means that the signal strength within the inner perimeter at step 305 has fallen below an acceptable level. The inner sensor at step 302 thus signals the controller at step 304. The controller at step 304 responds by increasing the signal strength output by the access point at step 301.

Meanwhile, the outer sensor at step 303 (which is located along the outer perimeter at step 306) is simultaneously detecting signals broadcast from the AP at step 301. If the outer sensor at step 303 detects a pre-determined signal strength from the AP at step 301, this means that the signal is bleeding beyond the desired range of the outer perimeter at step 306. The perimeter sensor at step 303 will then automatically signal the controller at step 304. The controller at step 304 responds to the signal from step 303 by reducing the signal output from the access point at step 301. These steps repeat continuously to ensure real-time protection from excessive signal bleed detected at the sensor perimeter at step 303.

In this way, the access point at step 301 continually produces an optimal signal strength output to maintain coverage within the inner perimeter at step 305. Meanwhile, the access point is protected from producing excessive signal strength output that bleeds outside of the outer perimeter at step 306.

Furthermore, the outer sensor at step 303 in FIG. 3 can be set by default to signal the controller at step 304 with a higher priority than that of the inner sensor at step 302, thus making prevention of excessive signal bleed at the outer perimeter at step 306 the overriding priority.

Alternatively, the inner sensor can be given priority over the outer sensor, making adequate wireless coverage for users within the building the overriding priority.

The above description is included to illustrate the operation of the preferred embodiments, and is not meant to limit the scope of the invention. From the above discussion, many variations will be apparent to one skilled in the art that would yet be encompassed by the spirit and scope of the present invention.

The invention claimed is:

1. An apparatus configured to protect a wireless local area network, said wireless local area network comprising at least one access point (AP), said apparatus comprising:
   a. means for setting the acceptable signal strength to be allowed at a perimeter,
   b. means for sensing the radio frequency (RF) signal strength at the perimeter using RF signal sensors,
   c. means for providing feedback from the sensors to a radiation source controller, and
   d. means for adjusting the central radiation source signal strength upwards or downwards based on acceptable ranges,
   e. assigning a higher priority to feedback from outer perimeter sensors in order to override feedback from inner perimeter sensors where there is a conflict.

2. The apparatus of claim 1, wherein said means for adjusting performs adjustments in real time.

3. A method to protect a wireless local area network (WLAN), said WLAN comprising at least one access point (AP), comprising the steps of:
   a. setting the acceptable signal strength (bleed) to be allowed at a perimeter,
   b. sensing the radio frequency (RF) signal strength at the perimeter using RF signal sensors,
   c. providing feedback from the sensors to the central radiation source controller, and
   d. adjusting the central radiation source signal strength upwards or downwards based on acceptable ranges,
   e. assigning a higher priority to feedback from outer perimeter sensors in order to override feedback from inner perimeter sensors where there is a conflict.

4. The method of claim 3, further including the step of:
   a. repeating steps a through d in real time to provide constant optimization.

5. The method of claim 3, wherein said multiple processes include protecting wireless local area networks.

6. The method of claim 3, wherein said multiple processes include automatically regulating the RF signal bleed from wireless networks.

7. The method of claim 3, wherein said invention uses sensors located on a campus perimeter to measure RF signal bleed.

8. The method of claim 3, further including providing feedback to a central controller from RF perimeter sensors.

9. The method of claim 3, wherein the central controller adjusts signal output based on feedback from RF perimeter sensors.

10. The method of claim 3, further including using constant feedback to prevent excessive perimeter signal bleed in real time.

11. The method of claim 3, further including using multiple perimeter sensors to provide optimized control of RF signal bleed.

12. The method of claim 3, further including using multiple, independent perimeter sensors to provide more granular control of RF signal bleed.

13. The method of claim 3, further including using directional perimeter sensors to provide more accurate control of RF signal bleed.

14. The method of claim 3, further including using amplified perimeter sensors to provide more sensitive control of RF signal bleed.

15. The method of claim 3, further including using different nodes in a wireless mesh network for automatically assigning flexible perimeters in real time.

16. A method for protecting wireless network signal bleed outside of an outer perimeter, while attempting to maintain adequate signal strength within an inner perimeter, comprising the steps of:
   a. sensing signal strength on the outer perimeter,
   b. providing continual feedback to ensure the signal strength does not rise above a detectable level at the outer perimeter,
   c. sensing signal strength on the inner perimeter,
   d. providing continual feedback to ensure the signal strength does not fall below a detectable level at the outer perimeter, i.e., balancing the signal strength within an acceptable range based on simultaneous feedback from both the outer perimeter sensors and inner perimeter sensors,
   e. assigning a higher priority to feedback from inner perimeter sensors in order to override feedback from outer perimeter sensors where there is a conflict.

17. The method of claim 16, wherein the step of protecting wireless network signal bleed is accomplished using an outer perimeter.

18. The method of claim 16, wherein the step of maintaining adequate signal strength is accomplished using an inner perimeter.

19. The method of claim 16, further including: balancing the signal strength within an acceptable range based on simultaneous feedback from both the outer perimeter sensors and inner perimeter sensors.

20. The method of claim 16, further including: assigning both perimeters to the same point in space, including assigning both perimeters to the same device or the same node in a wireless mesh network.

21. A method for protecting wireless network signal bleed outside of an outer perimeter, while attempting to maintain adequate signal strength within an inner perimeter, accomplished using feedback from distinct sets of perimeter sensors, and further comprising the steps of:

a) sensing signal strength on the outer perimeter,
b) providing continual feedback to ensure the signal strength does not rise above a detectable level at the outer perimeter,
c) sensing signal strength on the inner perimeter,
d) providing continual feedback to ensure the signal strength does not fall below a detectable level at the outer perimeter,
e) balancing the signal strength within an acceptable range based on simultaneous feedback from both the outer perimeter sensors and inner perimeter sensors
f) assigning a higher priority to feedback from the outer perimeter sensors in order to override feedback from the inner perimeter sensors where there is a conflict.

* * * * *